US011149155B2

(12) United States Patent
Pickrell et al.

(10) Patent No.: US 11,149,155 B2
(45) Date of Patent: Oct. 19, 2021

(54) ELECTRICALLY-INSULATING ENERGY-CURABLE INKJET FLUIDS

(71) Applicant: SUN CHEMICAL CORPORATION, Parsippany, NJ (US)

(72) Inventors: Michael Pickrell, Bristol (GB); Nigel Caiger, Wells (GB); Derek Illsley, Bath (GB)

(73) Assignee: Sun Chemical Corporation, Parsippany, NJ (US)

( * ) Notice: Subject to any disclaimer, the term of this patent is extended or adjusted under 35 U.S.C. 154(b) by 357 days.

(21) Appl. No.: 15/569,648

(22) PCT Filed: Apr. 29, 2016

(86) PCT No.: PCT/US2016/030092
§ 371 (c)(1),
(2) Date: Oct. 26, 2017

(87) PCT Pub. No.: WO2016/178989
PCT Pub. Date: Nov. 10, 2016

(65) Prior Publication Data
US 2018/0112089 A1    Apr. 26, 2018

Related U.S. Application Data

(60) Provisional application No. 62/155,502, filed on May 1, 2015.

(51) Int. Cl.
| | | |
|---|---|---|
| *C09D 11/101* | (2014.01) | |
| *C09D 11/38* | (2014.01) | |
| *B05D 3/06* | (2006.01) | |
| *C09D 11/322* | (2014.01) | |
| *C09D 4/00* | (2006.01) | |

(52) U.S. Cl.
CPC ............ *C09D 11/101* (2013.01); *B05D 3/067* (2013.01); *C09D 4/00* (2013.01); *C09D 11/322* (2013.01); *C09D 11/38* (2013.01)

(58) Field of Classification Search
CPC ...................................................... C09D 4/00
See application file for complete search history.

(56) References Cited

U.S. PATENT DOCUMENTS

| | | | | |
|---|---|---|---|---|
| 7,662,224 | B2* | 2/2010 | Sloan | B44C 3/04 |
| | | | | 106/31.13 |
| 2003/0109599 | A1* | 6/2003 | Kamen | C09D 11/101 |
| | | | | 523/160 |
| 2003/0149130 | A1* | 8/2003 | Kondo | C09D 11/101 |
| | | | | 523/160 |
| 2008/0090930 | A1* | 4/2008 | Madhusoodhanan | C08F 2/46 |
| | | | | 522/83 |
| 2009/0000508 | A1* | 1/2009 | Edison | C09D 11/101 |
| | | | | 106/31.6 |
| 2009/0163615 | A1 | 6/2009 | Halahmi et al. | |
| 2013/0044187 | A1 | 2/2013 | Hammes et al. | |
| 2014/0151606 | A1 | 6/2014 | Lowenthal et al. | |
| 2014/0151607 | A1 | 6/2014 | Lowenthal et al. | |

FOREIGN PATENT DOCUMENTS

| | | |
|---|---|---|
| EP | 1 543 704 B1 | 5/2006 |
| JP | 80-088029 | 3/1998 |
| JP | 2003/292857 A | 10/2003 |
| WO | WO 94/09013 A1 | 4/1994 |
| WO | WO 2006/085992 A2 | 8/2006 |
| WO | WO 2014/032968 A1 | 3/2014 |
| WO | WO 2014/085473 A1 | 6/2014 |
| WO | WO 2014/126720 A1 | 8/2014 |

OTHER PUBLICATIONS

International Search Report issued in International Application No. PCT/US2016/030092, dated Jul. 29, 2016.
Written Opinion of the International Searching Authority issued in International Application No. PCT/US2016/030092, dated Jul. 29, 2016.
International Preliminary Report issued in PCT/US2016/030092, dated Nov. 7, 2017.

* cited by examiner

*Primary Examiner* — Ian A Rummel
(74) *Attorney, Agent, or Firm* — Marian E. Fundytus; Ostrolenk Faber LLP.

(57) ABSTRACT

The present invention is directed to an energy curable ink or coating composition comprising a low migration photoinitiator, and at least one multifunctional hybrid monomer having a polymerizable (meth)acrylate group and a polymerizable vinylether group, and electrically insulating dielectric layers for use in printed electronic devices formed upon curing the ink or coating composition.

29 Claims, No Drawings

ELECTRICALLY-INSULATING ENERGY-CURABLE INKJET FLUIDS

CROSS REFERENCE TO RELATED APPLICATIONS

The present application is a § 371 National Phase application based on PCT/US2016/030092 filed Apr. 29, 2016, which claims the benefit of U.S. Provisional Application No. 62/155,502, filed May 1, 2015 the subject matter of each of which is incorporated by reference in their entirety.

FIELD OF THE INVENTION

The present invention is directed to an energy curable ink or coating composition comprising at least one multifunctional hybrid monomer having a polymerizable (meth)acrylate group and a polymerizable vinylether group. When the ink or coating composition is cured it provides an electrically insulating dielectric layer that can be used in printed electronic devices.

BACKGROUND OF THE INVENTION

The present invention is concerned with providing energy curable inks or coating compositions that can be printed, typically using inkjet printing, onto a substrate and subsequently cured to provide an electrically insulating dielectric layer for the use in printed electronic devices.

A dielectric layer is an electrical insulator layer that can be polarised in the direction of an electrical field. Typically polymers having a dipolar content, such as poly(vinyl pyrollidone), poly(methyl acrylate), poly(vinyl chloride) and polyamides are used to provide such dielectric layers.

In addition to acting as electrically insulating layers in electronic devices, thereby preventing electrical leakage (i.e. short circuits) between distinct conducting portions, dielectric layers have the capacity to polarise in the direction of the electric field and help to reduce the effect of any electromagnetic coupling between discrete conducting tracks.

Preferably, electrically insulating dielectric layers use insulators having low dielectric constants given that those with high dielectric constants are prone to breakdown, both physically and electrically, when subjected to electric fields and hence lose their insulating capacity.

The polymers mentioned herein above have dielectric constants, defined as the ratio of the permittivity of a substance to that of a vacuum, typically in the range 2 to 5, whereas a poor insulator such as titanium dioxide has a dielectric constant of 100.

Dielectric layers are used in a wide variety of electronic devices, such as transistors, diodes, capacitors, resistors, photovoltaic cells, batteries and organic light emitting diodes (OLEDs).

The miniaturization of the wiring and multi-layering in such devices requires the patterning of dielectric layers into ever more complicated and fine shapes. Furthermore there is also a growing requirement that such dielectric layers need to be patterned onto a variety of substrates which include flexible substrates.

Typically conventional microfabrication techniques utilize subtractive processes such as etching. However, the present invention also provides energy curable ink and coating compositions that can be printed onto flexible substrates to produce such complicated and fine shapes and this significantly reduces the number of process steps, the energy required and the waste generated.

WO2006/085992 is directed to radiation curable inkjet inks that exhibit good stability which contain ethylenically unsaturated monofunctional monomers, ethylenically unsaturated di functional monomers, optionally ethylenically unsaturated polyfunctional monomers, optionally ethylenically unsaturated urethane oligomers, a pigment dispersion and a polymerization initiator.

Wherein the inks contain ethylenically unsaturated polyfunctional monomers these are used in the amount of between 0 to about 15% by weight and may include a multifunctional hybrid monomer such as 2-(2-vinyloxyethoxy) ethyl acrylate (VEEA).

WO94/09013 is directed to an ultraviolet (UV) curable polymerizable coating system comprising the reaction product of an organic polyisocyanate, an acrylate substituted polyol and an alkoxysilane substituted amine.

JP10088029 discloses UV curable dielectric compositions wherein the curing is initiated by free radical photoinitiators (e.g. 1-hydroxycyclohexyl phenyl ketone), which comprise vinyl ethers along with acrylate-functional oligomers and monomers.

EP1 543 704 describes a UV curable dielectric inkjet fluid wherein the polymerizable component consists of a high amount of monofunctional monomers and photoinitiators, such as, 2-hydroxy-2-methylpropiophenone, isopropyl thioxanthone (ITX) and benzophenone which are prone to migration and volatilisation.

US2009/0163615 discloses ink-jettable compositions comprising greater than 10% by weight of monofunctional monomers and which also contain solvents.

Similarly, US20140151607, US20140151606, WO2014085473 all describe UV curable ink compositions which again comprise significant concentrations of monofunctional monomers.

Finally JP2003292857 describes UV curable electrically-insulating inks comprising a polyester along with a high concentration of monofunctional monomer, such as phenoxyethyl acrylate.

SUMMARY OF THE INVENTION

The present invention provides an energy curable ink or coating composition comprising:
  a) at least one multifunctional hybrid monomer having a polymerizable (meth)acrylate group and a polymerizable vinylether group and;
  b) between 0.1 to 15.0% by weight of photoinitiator wherein at least 50% by weight of the photoinitiatior is a low migration photoinitiator;
  and wherein the ink or coating composition comprises less than 30% by weight of a monofunctional monomer and less than 10% by weight of solvent.

Furthermore the present invention provides a process for producing an electrically insulating dielectric layer on a substrate comprising
  a) printing the ink or coating composition according to the present invention onto a substrate and
  b) curing the ink or coating composition.

Additionally the present invention also provides an electrically insulating dielectric layer printed onto a substrate comprising a cured ink or coating composition according to the present invention.

Finally the present invention provides a printed electronic device comprising at least one electrically insulating dielectric layer according to the present invention.

These and other objects, advantages, and features of the invention will become apparent to those persons skilled in the art upon reading the details of the methods and formulations as more fully described below.

DETAILED DESCRIPTION OF THE INVENTION

Typically when energy curable inks and coating compositions are used to form dielectric layers in electrical devices problems can arise when the electrical devices are subjected to further processing steps.

These further processing steps usually include thermal treatments, where the device is subjected to high temperatures, such as greater than 150° C., whilst other processing steps include lamination, sintering of conductive tracks (e.g. silver inks at 100 to 200° C.), and soldering. Furthermore it is also common to test the life-time of the electronic component by heating it at 120° C. for approximately 500 hours.

These failure modes can lead to loss of the insulating properties of the dielectric layer and equally seriously, actual physical damage of the device.

It has been found that these problems arise because substances remain within the dielectric layer that are prone to volatilization after the energy curable ink or coating composition has been cured leading to catastrophic damage of the device due to delamination, pin holing, fracturing and/or blistering.

The majority of energy curable inkjet fluids contain substantial quantities of monofunctional monomers and during the energy-curing process not all of the monofunctional monomer content of the ink is converted into polymer. Consequently there remains a fraction of uncured volatile monomer in the energy cured dielectric layer.

Furthermore, typical photoinitiators used in such inkjet fluids initiate free radicals under UV radiation to start the polymerization process. However, these photoinitiators produce photodecomposition by-products that are thermally volatile and therefore also contribute to the failure of the electrical device when subjected to high temperatures.

In particular, 2-hydroxy-2-methylpropiophenone, a commonly used hydroxy-ketone type photoinitiator can produce a number of low molecular weight by-products after UV-irradiation which, along with any unconsumed photoinitiator, can contribute to the volatilization loss during thermal treatment processes.

Furthermore where conventional low molecular weight di-, tri, and higher functional acrylate monomers, such as hexanediol diacrylate, are used, the shrinkage that occurs during the curing of the dielectric layer can be extreme. The resultant shrinkage can cause loss of substrate adhesion and in cases where the coating is applied to flexible substrates, deformation of the coated article.

The inks and coating compositions according to the present invention when cured to form dielectric layers are less prone to producing the above-mentioned failures when incorporated into electronic devices, thereby reducing the risk of defects such as delamination or loss of adhesion, blistering, loss of electrical insulation properties, and/or magnetic coupling.

Furthermore it has been found that a particular advantage arising from the use of VEEA, or other similar hybrid monomers, or blends thereof, is that they reduce the shrinkage that occurs during the curing process.

Additionally it has been found that a further advantage of inks and coating compositions is that they are capable of adjoining electrical device components comprising polymeric materials and this is a particularly important consideration as printable electronic manufacture moves towards the use of semiconductor and electrically conducting components based on polymeric materials, such as composites and polymers which can act as semiconductors or conductive materials, or the underlying substrate itself.

In particular if a UV cured layer contains any significant proportion of uncured, or unbound, or other migratable species, then these components, over time, can diffuse into the adjoining polymer-based structures of the electronic device. The potential consequences of this diffusion from the insulating layer could be a change or loss of properties in the adjoining layers, whether that is physical or electrical. Clearly, ink or coating compositions of the present invention help to overcome these potential issues.

Finally, a further advantage is that after being cured the ink or coating compositions show minimal water uptake when immersed in water, which is believed to arise from the use of predominantly multifunctional monomers as well as those ink and coating compositions where an inert resin is included. This is advantageous as it ensures that the electrical-insulating properties will be maintained in wet or humid conditions.

Accordingly the present invention is directed to energy curable inks or coating compositions which contain at least one polymerizable multifunctional hybrid polymer having at least one (meth)acrylate group and at least one vinyl ether group, which when cured can act as electrically-insulating dielectric layers.

Additionally, the inks and coating compositions according to the present invention contain at least one low migration photoinitiatior, comprise less than 30% by weight monofunctional monomers and are essentially free of solvent or other volatile substances.

The at least one polymerizable multifunctional hybrid polymer having at least one (meth)acrylate group and at least one vinyl ether group is advantageously 2-(2-vinyloxy-ethoxy) ethyl acrylate and/or 2-(2-vinyloxyethoxy) ethyl methacrylate.

Typically, the low migration photoinitiators also exhibit low volatility, especially in those ink or coating compositions cured under the action of UV-light. Thus, the types of photoinitiators preferred are those having a polymeric backbone and/or are multifunctional with respect to the number of photoinitiator moieties contained in the molecular structure. Polymerizable photoinitiators may also be used.

Preferred photoinitiators include those contained in, or to be introduced into at a future date, EUPIA's (European Printing Ink Association) suitability list of photoinitiators for low migration UV Printing Inks and Varnishes. Particularly favored photoinitiators include phenyl bis(2,4,6-trimethylbenzoyl) phosphine oxide ('Irgacure 819', Cas. No. 162881-26-7), difunctional hydroxyl ketone types such as Irgacure 127 (Cas. No. 474510-57-1) and Escure KIP160 (Cas. No. 71868-15-0).

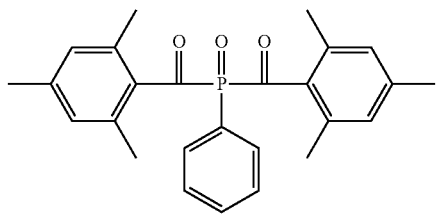

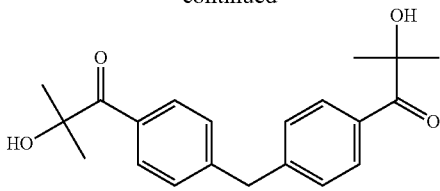

Irgacure 819 (ex. BASF) Irgacure 127 (ex. BASF)

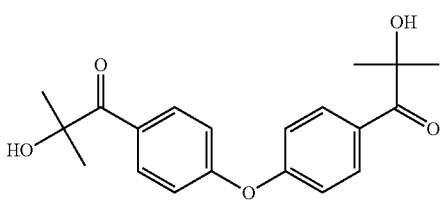 [SMILES: CC(C)(O)C(=O)c1ccc(Oc2ccc(C(=O)C(C)(C)O)cc2)cc1]

Esacure KIP160 (ex. Lamberti)

Polymeric photoinitiators, wherein photoinitiator moieties are chemically attached to a polymeric core are also highly preferable photoinitiators. An example of a polymeric photoinitiator is Omnipol TX (ex. IGM Resins, CAS No.: 813452-37-8), which has the following structure;

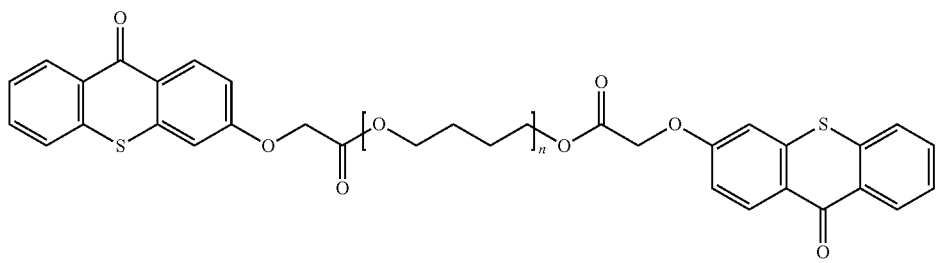

Other similar polymeric photoinitiators such as those comprising benzophenone, aminoketone, or other photoinitiator groups may also be used.

Furthermore another group of photoinitiators having low volatility/migration potential are those known as polymerizable photoinitiators, wherein a molecule comprising both polymerizable and photoinitiator groups are used, such as those described in U.S. Pat. No. 8,759,412.

Advantageously, the ink and coating compositions contain between 1.0 to 10.0% by weight of photoinitiator, preferably between 2.0 to 10.0% by weight, such as between 4.0 to 10.0% by weight and most preferably between 5 to 8% by weight of photoinitiator, wherein at least 50% by weight, such as at least 60% by weight, preferably at least 70% by weight and advantageously at least 80% by weight, such as at least 90% by weight of the photoinitiator is a low migration photoinitiator.

Preferably the ink and coating compositions contain less than 3.0% by weight of free radical photoinitiator, and advantageously less than 2.0% by weight, such as less than 1.0% by weight of free radical photoinitiator such as 1-hydroxycyclohexyl phenyl ketone.

Preferably, the ink and coating compositions comprise less than 20% by weight of monofunctional monomer, and even more preferably the ink and coating composition comprise less than 10% by weight of monofunctional monomers.

Usually the ink and coating compositions contain between 10 to 60% by weight of the multifunctional hybrid monomer and advantageously between 20 to 50% by weight of the multifunctional hybrid monomer.

Typically the ratio of the multifunctional hybrid monomer to monofunctional monomer in the ink and coating compositions is greater than 1:1, preferably greater than 2:1, more preferably greater than 5:1 and advantageously greater than 10:1.

The ink and coating compositions of the present invention are preferably essentially free of any solvent. However, if required, the ink and coating compositions may be diluted with either organic or aqueous solvents.

The ink or coating composition may preferably contain at least one difunctional monomer typically in the amount of between 20 to 60% by weight. Advantageously the difunctional monomer is a diacrylate.

Preferably the diacrylate is selected from 1,3-butylene glycol dimethacrylate; 1,4-butanediol dimethacrylate, 1,6 hexanediol diacrylate, 1,6 hexanediol dimethacrylate, alkoxylated diacrylate, diethylene glycol dimethacrylate, dipropylene glycol diacrylate, ethoxylated (10) bisphenol a diacrylate, ethoxylated (2) bisphenol A dimethacrylate, ethoxylated (3) bisphenol a diacrylate, ethoxylated (3) bisphenol A dimethacrylate, ethoxylated (4) bisphenol A diacrylate; ethoxylated (4) bisphenol A dimethacrylate, ethoxylated bisphenol A dimethacrylate, ethoxylated (10) bisphenol dimethacrylate, ethylene glycol dimethacrylate, polyethylene glycol (200) diacrylate, polyethylene glycol (400) diacrylate, polyethylene glycol (400) dimethacrylate, polyethylene glycol (400) dimethacrylate, polyethylene glycol (600) diacrylate, polyethylene glycol (600) dimethacrylate, polyethylene glycol 400 diacrylate; propoxylated (2) neopentyl glycol diacrylate, tetraethylene glycol diacrylate, tetraethylene glycol dimethacrylate, tricyclodecane dimethanol diacrylate, tricyclodecanedimethanol dimethacrylate, triethylene glycol diacrylate, triethylene glycol dimethacrylate and/or tripropylene glycol diacrylate.

Advantageously, the diacrylate is selected from 3-methylpentane diol diacrylate and/or polyethylene glycol diacrylate.

The ink or coating composition may also include at least one trifunctional monomer, preferably in the amount of 10 to 60% by weight. Advantageously the trifunctional monomer is a triacrylate.

Preferably the triacrylate is selected from ethoxylated (15) trimethylolpropane triacrylate, ethoxylated (3) trimethylolpropane triacrylate, ethoxylated (6) trimethylolpropane triacrylate, ethoxylated (9) trimethylolpropane triacrylate, ethoxylated 5 pentaerythritol triacrylate, ethoxylated (20) trimethylolpropane triacrylate, propoxylated (3) glyceryl triacrylate, trimethylolpropane triacrylate, propoxylated (5.5) glyceryl triacrylate, pentaerythritol triacrylate, propoxylated (3) glyceryl triacrylate, propoxylated (3) trimethylolpropane triacrylate, trimethylolpropane triacrylate, trimethylolpropane trimethacrylate, tris (2-hydroxy ethyl) isocyanurate triacrylate, di-trimethylolpropane tetraacrylate, dipentaerythritol pentaacrylate, ethoxylated (4) pentaerythritol tetraacrylate, pentaerythritol tetraacrylate and/or dipentaerythritol hexaacrylate.

Preferably, the triacrylate is ethoxylated trimethylol propane triacrylate.

In particular, it has been found that alkoxylated cores, such as ethoxylated trimethyloltriacrylate and poly(ethylene glycol) diacrylates produce less shrinkage of the dielectric layer on curing. This feature is particularly advantageous as reduced shrinkage is beneficial in both terms of improved adhesion but also in terms of reducing any deformation of the final device.

The inks and coating compositions may also contain other functional monomers such as N-vinyl Caprolactam, N-vinyl oxazolidinone and N-vinyl pyrrolidone, and secondary or tertiary acrylamides such as acryloyl morpholine, diacetone acrylamide, N-methyl acrylamide, N-ethyl acrylamide N-isopropyl acrylamide, N-t.butyl acrylamide, N-hexyl acrylamide, N-cyclohexyl acrylamide, N-octyl acrylamide, N-t.octyl acrylamide N-dodecyl acrylamide, N-benzyl acrylamide, N-(hydroxymethyl)acrylamide, N-isobutoxymethyl acrylamide, N-butoxymethyl acrylamide, N,N-dimethyl acrylamide, N,N-diethyl acrylamide, N,N-propyl acrylamide, N,N-dibutyl acrylamide, N,N-dihexyl acrylamide, N,N-dimethylamino methyl acrylamide, N,N-dimethylamino ethyl acrylamide, N,N-dimethylamino propyl acrylamide, N,N-dimethylamino hexyl acrylamide, N,N-diethylamino methyl acrylamide, N,N-diethylamino ethyl acrylamide, N,N-diethylamino propyl acrylamide, N,N-dimethylamino hexyl acrylamide, and/or N,N'-methylenebisacrylamide.

Furthermore the ink and coating compositions of the present invention may also comprise any type or blend of radiation-curable oligomers, such as polyurethane acrylates, polyester acrylates, polyether acrylates and epoxy acrylates. The inks and coating compositions may further comprise inert resins, which are typically dissolved into the monomer.

Preferably the inert resin is an acrylic resin.

Advantageously the inert resin has an average molecular weight of less than 20,000 amu such as between 2000 to 15000 amu.

The inks and coating compositions may also contain an acrylic polymer or copolymer which are typically prepared by the (thermal) free radical polymerization of blends of monomers including styrene, butyl (meth)acrylate, ethyl (meth)acrylate, methyl (meth)acrylate, and/or isobutyl (meth)acrylate.

Typically the acrylic polymer has an average molecular weight of preferably less than 20,000 g/mole and advantageously less than 10,000 g/mole.

Examples of acrylic polymers include those supplied from Dianal, Elvacite Rohm and Haas and DSM amongst others.

Usually the acrylic polymer is present in the ink and coating composition in a weight range of between 2 and 15% by weight, more preferably between 5 and 15% by weight and advantageously between 8 and 15% by weight.

Additionally, other types of resin can also be incorporated into the ink and coating compositions such as polyesters, polyamides, polyurethanes, ketone and aldehyde resins, alkyds, amino resins, phenolic resins, novolaks, epoxy resins, vinyl resins, silicones, nitrocellulose resins, cellulose ester and ether resins, rosin esters, polysulphides, polyethers, polyoxadiazoles and/or polyoxazolines.

In another embodiment of the present invention the ink and coating compositions contain at least one silane material, preferably in the amount of between 0.1 to 10% by weight and advantageously the silane material is a mixture of alkoxy-silane functional compounds.

Advantageously the alkoxy-silane functional compounds are selected from 3-(meth)acryloxypropyl trimethoxysilane, 3-(meth)acryloxypropyltriethoxysilane, glycidoxypropyltrimethoxysilane, glycidoxypropyltriethoxysilane, aminopropyltrimethoxysilane, aminopropyltriethoxysilane, tetramethylorthosilicate, tetraethylorthosilicate, triethoxymethylsilane, and/or vinyltrimethoxysilane.

In a preferred embodiment the inks and coating compositions may include a material containing silica, preferably in the amount of between 0.1 to 10% by weight. Suitable materials include fumed silica such as the Aerosil range from Evonik and nano colloidal silica dispersions such as the Nanocryl range from Evonik.

Additionally the inks and coating compositions may include other inorganic materials such as alumina, zirconia, titania, ceria, zinc oxide, iron oxides.

Furthermore, clays, laponies, hydrotalcites, halloysites, and other inorganic lamellar type nanoparticles may also be used in ink and coating compositions of the present invention.

The inclusion of these types of nanoparticles can further improve the electrical insulating properties of the inks and can induce thixotropy into the inks, which can help to improve the print resolution by minimizing the drop spread after printing.

The ink and coating compositions may also contain pigments, dyes and other components which enable them to perform in their intended application. These other components include, stabilizers, wetting aids, slip agents, antifoams, fillers and/or rheological aids.

Additionally the ink and coating compositions may contain compounds which provide adhesion to metallic or ceramic surfaces and a particularly preferred class of adhesion promoter is that comprising an alkoxy-silane, such as tetramethylorthosilicate, tetraethylorthosilicate, triethoxymethylsilane, vinyltrimethoxysilane, (meth)acryloxypropyl trimethoxysilane, glicidyloxypropyltrimethoxysilane, and/or aminopropyltriethoxysilane.

Finally the ink and coating compositions may be essentially free of colored material, or may contain colorants to provide a desired color to the finished electrically-insulating layer.

The inks and coating compositions are typically printed onto the substrate using inkjet printing and this facilitates the printing of variable designs, thus enabling the production of different products in any production run and thus mass customization.

Additionally, given that inkjet printing is a non-contact process, it is favorable for use with fragile substrates and those having topographical surface features i.e. rough or smooth or 3-dimensional objects.

Furthermore inkjet printing is suitable for both flexible and rigid substrates and is a high speed process providing accurate and high resolution of printed electronics when compared to other printing methods such as screen printing.

Piezo inkjet print heads are preferred for the delivery of the ink and coating compositions of the present invention. However, other print head technologies, including but not restricted to continuous inkjet and thermal inkjet may also be used.

Although the compositions of the present invention are preferably applied as 1-pack compositions, they may also be applied as 2-pack compositions. Where applied as 2-pack (or even 3-pack) composition, the first component of the composition is printed onto the substrate prior to the second component and then the final print is cured to deliver the desired electrically insulating layer.

2-Pack compositions include, ink and coating compositions where the alkoxy-silane component is segregated from the rest of the ink or coating composition. In this case the silane containing component can be applied either before or after the second component of the ink or coating composition. In a further instance of a 2-pack composition, the alkoxy silane component can be added to the rest of the ink or coating composition prior to the blended ink or coating composition being applied to the substrate.

The printed inks and coating compositions may be cured under the action of (actinic) electromagnetic radiation of various types including, electron-beam, UV light, visible light, laser light, infrared light and microwaves. Curing under the action of UV light is preferred and sources such as a high-voltage mercury bulb, a medium-voltage mercury bulb, a xenon bulb, a carbon arc lamp, a metal halide bulb, a UV LED lamp or sunlight, can be used.

In particular UV curing when used in conjunction with inkjet printing allows for the rapid patterning of dielectric layers with good resolution.

Ink and coating compositions of the present invention are preferably applied as discrete electrically insulating layers in the manufacture of electronic components. However, they may also be applied over existing electrically insulating layers, or dielectric layers, or other surfaces of an electronic component. The ink and coating compositions of the present invention may also be applied over damaged areas of existing electrically insulating, or dielectric layers of an electronic component to affect its repair.

The ink and coating compositions can be applied to any substrate and typical substrates include glasses, metals (including copper), metal oxides (such as indium tin oxide, titanium dioxide, cerium oxide, zinc oxide), semiconductor materials (such as; silicon, copper indium gallium selenide, cadmium telluride, perovskite and loparite) and flexible and rigid plastic substrates (such as PET, LDPE, HDPE, LLDPE, PP, polystyrene, PEN, polyamide, polycarbonate, polyimide, acrylic, etc.) and ceramic materials (such as ceramics formed from clays or modified clays, alumina).

The invention is further described by the examples given below.

EXAMPLES

Example 1

To demonstrate the benefit of using a hybrid monomer comprising both acrylate and vinyl ether polymerizable groups in the same molecule, the inkjet compositions described in Table 1 were prepared and tested.

The compositions were applied to a 50 m PET film at a thickness of 16 m, using a calibrated K-Bar (ex. RK Print), and then cured using a medium pressure mercury lamp (H-Bulb) with a total UV-dose of 200 mJ/cm$^2$. This was achieved by passing the coated films through a Fusion UV Systems UV-Rig where the belt speed had been adjusted so that the UV-dose, as measured by a calibrated International Light Technologies ILT 490 Profiling Belt Radiometer (covering the UV-A and UV-B ranges), was about 200 mJ/cm$^2$.

The cured films were then assessed for odor and the degree of shrinkage occurring during the UV-curing process. Odor was assessed by assigning a scale of 1 to 10 with 10 representing no detectable odor and 1 being a strong and unpleasant odor. Shrinkage was assessed as being the extent to which the shrinkage of the coating during the UV-curing process caused curling of the coated PET film. Again a rating system of 1 (severe curling) to 10 (no observable curling) was used. The weight loss from the UV-cured coatings at 100 and 150° C. was determined by placing 100 cm$^2$ samples of the coated PET films in ovens set at these temperatures for 2 hours. The PET film used in these experiments was found to be highly uniform, therefore allowing a ready assessment of the percentage weight loss from the cured coating itself to be determined.

The viscosities of the inks were measured using a Brookfield DV-II+ Pro Viscometer equipped with Spindle no. 18, at 100 rpm.

TABLE 1

Inventive Compositions Showing the Benefit of Monomer Functionality

| | Comparative Example 1 | Comparative Example 2 | Inventive Example 1 | Inventive Example 2 | Inventive Example 3 |
|---|---|---|---|---|---|
| VEEA | — | — | 30.0 | 30.0 | 35.0 |
| NVC | 25.0 | — | — | — | — |
| CTFA | 58.4 | — | — | — | — |
| PEG300DA | — | — | — | — | — |
| TMP(EO)15TA | — | — | — | 15.0 | 25.0 |
| 3-MePDDA | — | 83.4 | 53.4 | 38.4 | 23.4 |
| Paraloid DM55 | — | — | — | — | — |
| Omnirad TPO | 3.0 | 3.0 | 3.0 | 3.0 | 3.0 |
| Irgacure 819 | — | — | — | — | — |
| Omnirad 481 | 3.0 | 3.0 | 3.0 | 3.0 | 3.0 |
| Omnirad ITX | 2.0 | 2.0 | 2.0 | 2.0 | 2.0 |
| Omnipol TX | — | — | — | — | — |
| Esacure KIP160 | — | — | — | — | — |
| Omnipol 910 | — | — | — | — | — |
| Ebecryl P116 | 2.0 | 2.0 | 2.0 | 2.0 | 2.0 |
| Ebecryl LEO10552 | — | — | — | — | — |
| TegoGlide 410 | 0.4 | 0.4 | 0.4 | 0.4 | 0.4 |
| Ethanox 4703 | 0.2 | 0.2 | 0.2 | 0.2 | 0.2 |
| Magenta Pigment Dispersion | 6.0 | 6.0 | 6.0 | 6.0 | 6.0 |
| Total | 100.0 | 100.0 | 100.0 | 100.0 | 100.0 |
| Viscosity (50° C.) (mPa · s) | 6.48 | 4.71 | 3.63 | 5.43 | 7.05 |
| Print Odour | Very Strong (2) | Slight Monomer (4) | Slight Monomer (4) | Moderate (5) | Moderate (5) |
| Shrinkage | V. Slight (9) | Severe (2) | Moderate (5) | Minor (7) | V. Slight (9) |
| Weight Loss at 100° C. (% (w/w)) | 4.3 | 4.9 | 2.3 | 2.2 | 1.4 |
| Weight Loss at 150° C. (% (w/w)) | 13.2 | 10.4 | 4.6 | 7.1 | 7.7 |

Notes to Table 1
VEEA = 2-(2-vinyloxyethoxy)ethyl acrylate
CTFA = Cyclic Trimethylol-propane Formal Acrylate.
NVC = N-Vinyl Caprolactam
3-MePDDA = 3-Methylpentanediol diacrylate
DPGDA = Dipropylene glycol diacrylate
PEG300DA = Poly(ethylene glycol, molecular weight = 300) Diacrylate

TABLE 1-continued

Inventive Compositions Showing the Benefit of Monomer Functionality

|  | Comparative Example 1 | Comparative Example 2 | Inventive Example 1 | Inventive Example 2 | Inventive Example 3 |
|---|---|---|---|---|---|

TMP(EO)15TA = Ethoxylated TrimethylolPropane (15 moles equivalent of ethoxylation) triacrylate
DM55 = Paraloid DM55 (An acrylic polymer, ex. Dow)
Ebecryl P116 and LEO10552 = Acrylated amines (ex. Allnex)
Omnirad TPO = 2,4,6-Trimethylbenzoyl-diphenyl oxide (ex. IGM)
Omnirad 481 = 1-Hydroxycyclohexyl phenyl ketone (ex. IGM)
Omnirad ITX = 2-Isopropyl thioxanthone (ex. IGM)
Irgacure 819 = Photoinitiator (ex. BASF); phenyl bis(2,4,6-trimethylbenzoyl) phosphine oxide
Omnipol TX = Polymeric Thioxanthone (ex. IGM)
Omnipol 910 = Polymeric Aminoketone photoinitiator (ex. IGM)
Esacure KIP160 = Photoinitiator (ex. Lamberti); a difunctional hydroxyl-ketone photoinitiator
Ethanox 4703 = Stabilizer (ex. Albemarle)
TegoGlide 410 = Slip Aid (ex. Evonik)
Magenta Dispersion = a dispersion containing 21.0% (w/w) of Pigment Red 122, the remainder comprising the dispersant (Solsperse 35000), stabilizers and DPGDA Table 1 shows that when the monofunctional monomer component of Comparative Example 1 is replaced with difunctional monomers of Inventive Examples 1 to 3, a significant reduction in the amount of volatile material is achieved, as determined at either 100 or 150° C. For Comparative Example 2, where all the monofunctional monomer component of Comparative Example 1 is replaced with the difunctional acrylate monomer, 3-methylpentanediol diacrylate, only a minor decrease in the amount of volatile material, as determined at 150° C., is observed. Only when the hybrid monomer 'VEEA', comprising an acrylate and a vinyl ether group in the molecular structure, is introduced is a significant decrease in the amount of volatile material observed. This supports one element of the present invention that such hybrid monomer types facilitate reduced volatiles. Furthermore, the introduction of VEEA into the composition also helps to reduce the amount of shrinkage that occurs upon UV-curing. Furthermore, when part of the 3-methyl pentanediol diacrylate of Inventive Example 1 is replaced with ethoxylated TMPTA, a further noticeable reduction in the degree of shrinkage occurs, as evidenced by the extent of curling of the printed substrate (Inventive Example 2). Inventive Example 3 shows that when the amount of the ethoxylated TMPTA component is increased the extent of shrinkage during UV-cure diminishes yet further.

Example 2

TABLE 2

Inventive Compositions Showing the Benefit of Photoinitiator Selection, Monofunctional Monomer Content and Incorporation of Acrylic Resin

|  | Inventive Example 4 | Inventive Example 5 | Inventive Example 6 | Inventive Example 7 | Inventive Example 8 | Inventive Example 9 | Inventive Example 10 |
|---|---|---|---|---|---|---|---|
| VEEA | 30.0 | 25.0 | 25.0 | 45.4 | 40.4 | 35.4 | 35.4 |
| NVC | — | 10.0 | 10.0 | — | — | — | — |
| CTFA | — | — | 10.0 | — | — | — | — |
| PEG300DA | — | — | — | — | 40.0 | 40.0 | 40.0 |
| TMP(EO)15TA | 15.0 | 15.0 | 10.0 | — | — | — | — |
| 3-MePDDA | 35.4 | 30.4 | 25.4 | 25.0 | — | — | — |
| Paraloid DM55 | — | — | — | 10.0 | — | — | — |
| Omnirad TPO | — | — | — | — | — | — | — |
| Irgacure 819 | 3.0 | 3.0 | 3.0 | 3.0 | 3.0 | 3.0 | 1.0 |
| Omnirad 481 | — | — | — | — | — | — | — |
| Omnirad ITX | — | — | — | — | — | — | — |
| Omnipol TX | 2.0 | 2.0 | 2.0 | 2.0 | 2.0 | 2.0 | 2.5 |
| Esacure KIP160 | 3.0 | 3.0 | 3.0 | 3.0 | 3.0 | 3.0 | 3.0 |
| Omnipol 910 | — | — | — | — | — | — | 1.5 |
| Ebecryl P116 | — | — | — | — | — | — | — |
| Ebecryl LEO10552 | 5.0 | 5.0 | 5.0 | 5.0 | 5.0 | 10.0 | 10.0 |
| TegoGlide 410 | 0.4 | 0.4 | 0.4 | 0.4 | 0.4 | 0.4 | 0.4 |
| Ethanox 4703 | 0.2 | 0.2 | 0.2 | 0.2 | 0.2 | 0.2 | 0.2 |
| Magenta Pigment Dispersion | 6.0 | 6.0 | 6.0 | 6.0 | 6.0 | 6.0 | 6.0 |
| Total | 100.0 | 100.0 | 100.0 | 100.0 | 100.0 | 100.0 | 100.0 |
| Viscosity (50° C.) | 6.78 | 6.90 | 6.24 | 7.71 | 8.07 | 9.36 | 9.63 |
| Print Odour | Low (8) | Moderate (5) | Q. Strong (3) | Low (8) | Low (8) | Low (8) | Low (8) |
| Shrinkage | Slight (8) | Slight (9) | Slight (9) | Minor (7) | V. Slight (9) | V. Slight (9) | V. Slight (9) |
| Weight Loss at 100° C. (% (w/w)) | <1.0 | <1.0 | <1.0 | <1.0 | <1.0 | <1.0 | <1.0 |
| Weight Loss at 150° C. (% (w/w)) | 3.4 | 4.5 | 3.5 | <1.0 | 1.5 | 5.5 | 3.4 |

Inventive Example 4 shows the significant benefit of replacing the PI component of Inventive Example 2 with difunctional and polymeric photoinitiators, in terms of the volatile matter produced at 150° C. Inventive Examples 5 and 6 show that it is possible to incorporate controlled amounts of monofunctional monomer into the composition without compromising the amount of volatile material produced at 150° C. However, there is an impact on the print odour, which is ascribed to low concentrations of these monomers remaining in the cured film. Inventive Example 7, compared with Inventive Example 1, shows the considerable benefit of introducing an inert acrylic resin, both in terms of the shrinkage that occurs during UV-cure but perhaps more importantly with respect to the very low level of volatiles that are emitted, particularly at 150° C. Inventive Examples 8, 9 and 10 show that using a poly(ethylene glycol) diacrylate can result in compositions producing very little observable shrinkage upon UV-curing whilst at the same time delivering very low levels of volatile matter at 150° C.

Compositions comprising alkoxy-silanes and silica were prepared according to Table 3. These compositions were applied to Transparent Conducting Oxide Panels (coated with Indium Tin Oxide) with a Dimatix Materials Printer (DMP2800, ex. FujiFilm) in a 9 cm by 9 cm pattern area; the approximate ink film thickness was 10 μm. The coated panels were then cured by passing them three times through the UV rig, at the settings previously described. The volatile content of these cured coatings was then determined by placing the panels in an oven set at 150° C., for 30 minutes and determining the weight loss from the coating.

Example 3

TABLE 3

Inventive Examples Incorporating Alkoxy-Silanes and Silica

|  | Inventive Example 11 | Inventive Example 12 | Inventive Example 13 | Inventive Example 14 |
| --- | --- | --- | --- | --- |
| VEEA | 47.35 | 54.15 | 43.65 | 32.65 |
| IBOA | — | 8.0 | 8.0 | 19 |
| Dianal ANUR | 15.0 | 14.2 | 9.7 | 9.7 |
| Irgacure 819 | 3.0 | 2.0 | 2.0 | 2.0 |
| KIP160 | 3.0 | 2.0 | 2.0 | 2.0 |
| DETX | — | 1.75 | 1.75 | 1.75 |
| Ebecryl P116 | 2.0 | 1.5 | 1.5 | 1.5 |
| TegoGlide 410 | 0.4 | 0.4 | 0.4 | 0.4 |
| Ethanox 4703 | 0.25 | 0.25 | 0.25 | 0.25 |
| Glymo | 4.0 | 3.0 | 3.0 | 3.0 |
| MEMO | 1.0 | 0.75 | 0.75 | 0.75 |
| Nanocryl C130 | — | — | 15.0 | — |
| White Pigment Dispersion 1 | 24.0 | — | — | 15.0 |
| Magenta Pigment Dispersion 2 | — | 12.0 | 12.0 | 12.0 |
| Total | 100.0 | 100.0 | 100.0 | 100.0 |
| Viscosity (50° C.) | 11.0 | 10.7 | 12.5 | 9.9 |
| Weight Loss at 150° C. (% (w/w)) | 7.3 | 7.8 | 5.0 | 5.6 |

Notes
to Table 3
IBOA = Isobornyl Acrylate
Dianal ANUR = Low Molecular Weight Acrylic Resin, ex. Dianal
DETX = Diethyl Thioxanthone
Glymo = 3-Glycidoxypropyltrimethoxysilane
MEMO = 3-Methacryloxypropyltrimethoxysilane
Nanocryl C130 = 50% (w/w) dispersion of colloidal nanosilica in CTFA (ex. Evonik)
White Pigment Dispersion = 50% (w/w) dispersion of RDI-S titanium dioxide (ex. Sachtleben), the remainder being CTFA and the dispersant, Solsperse 24000.
Magenta Pigment Dispersion 2 = 21% (w/w) dispersion of Hostaperm Red E5B02 (Violet 19), the remainder being PHEA and the dispersant, Solsperse 35000.
PHEA = Ethylene Glycol Phenyl Ether Acrylate.

Inventive Examples 11 to 14 show compositions comprising alkoxy-silanes and also finely dispersed silica. These illustrative examples exhibit excellent adhesion to glass and metallic surfaces as tested with Cross Hatch Test ASTM D3359-09 Adhesion Test Details.

The inks samples were tested on various substrates, after UV cure, and after and thermal treatment.

The addition of a post-bake of 30 minutes at 150 degrees C., increased the cross hatch result from 2B, to 5B on ITO coated glass, and Cr for all the above examples.

The inclusion of the colloidal nanosilica in Inventive Example 13 results in a reduction in the volatile loss at 150° C. It has also been found that the inclusion of nanosilica results in improved electrical insulation and reduced shrinkage during UV-curing.

Comparative Examples 1 and 2 have measured breakdown voltage of circa 85-90 kV per mm, whereas Inventive Example 11 has been measured at 105-110 kV per mm. Tested in accordant to IPC SM840E Class H.

The impact of water uptake was tested on samples prepared on Glass Slides, and cured using combination of LED, UV, and Thermal curing to represent typical conditions, Adhesion was tested before and after immersion test in water @ 85 degrees C., after 100, 200, and 250 hr. Examples 11 to 14 achieved 4B or above with a Cross Hatch Test according to ASTM D3359

The invention claimed is:
1. An ink or coating composition comprising
   a) at least one multifunctional hybrid monomer having a polymerizable (meth)acrylate group and a polymerizable vinyl ether group;
   b) between 4 to 10% by weight of photoinitiator wherein at least 55% by weight of the photoinitiator is a low migration photoinitiator;
   wherein the ink or coating is energy curable, wherein the ink or coating composition comprises less than 30% by weight of a monofunctional monomer and less than 10% by weight of solvent, and wherein, in the cured state, the ink or coating exhibits less than 10% weight loss when heated at 150° for a period of time in the range of thirty minutes to two hours;
   wherein the at least one multifunctional hybrid monomer is 2-(2-vinyloxyethoxy) ethyl acrylate.
2. The ink or coating composition according to claim 1, wherein the low migration photoinitiator is selected from a polymeric photoinitiator, multifunctional photoinitiator, and a polymerizable photoinitiator.

3. The ink or coating composition according to claim 1, wherein the photoinitiator is 2-hydroxy-2-methylpropiophenone.

4. The ink or coating composition according to claim 1, wherein the ratio of the at least one multifunctional hybrid monomer to the monofunctional monomer is greater than 1:1.

5. The ink or coating composition according to claim 1, comprising between 10 to 60% by weight of at least one multifunctional hybrid monomer.

6. The ink or coating composition according to claim 1, further comprising one or more of: at least one difunctional monomer; at least one trifunctional monomer; at least one acrylated amine; at least one inert resin; at least one silane material; or at least one silica material.

7. The ink or coating composition according to claim 6, comprising between 20 to 60% by weight of the at least one difunctional monomer and/or between 10 to 60% by weight of the at least one trifunctional monomer.

8. The ink or coating composition according to claim 6, wherein the at least one difunctional monomer is a diacrylate.

9. The ink or coating composition according to claim 8, wherein the diacrylate is 3-methylpentane diol diacrylate or polyethylene glycol diacrylate.

10. The ink or coating composition according to claim 6, wherein the at least one trifunctional monomer is a triacrylate.

11. The ink or coating composition according to claim 10, wherein the triacrylate is ethoxylated trimethylol propane triacrylate.

12. The ink or coating composition according to claim 6, wherein the at least one inert resin is an inert acrylic polymer.

13. The ink or coating composition according to claim 12, wherein the inert acrylic polymer has an average molecular weight of less than 20000 amu.

14. The ink or coating composition according to claim 6, wherein the at least one silane material is a mixture of alkoxy-silane functional compounds.

15. The ink or coating composition according to claim 14, wherein the mixture of alkoxy-silane functional compounds includes two or more compounds selected from 3-(meth)acryloxypropyl trimethoxysilane, 3-(meth)acryloxypropyltriethoxysilane, glycidoxypropyltrimethoxysilane, glycidoxypropyltriethoxysilane, aminopropyltrimethoxysilane, aminopropyltriethoxysilane, tetramethylorthosilicate, tetraethylorthosilicate, triethoxymethylsilane, vinyltrimethoxysilane, and combinations thereof.

16. The ink or coating composition according to claim 6, wherein the at least one silica material comprises silica or colloidal nanosilica.

17. The ink or coating composition according to claim 1, wherein the ink or coating composition is an inkjet ink, and/or wherein the ink or coating composition is a sprayable fluid.

18. The ink or coating composition according to claim 1, wherein the ink or coating composition has a viscosity of less than 25 mPa·s, at 50° C.

19. An electrically insulating dielectric layer printed onto a substrate comprising a cured ink or coating composition according to claim 1.

20. The electrically insulating dielectric layer according to claim 19, wherein the electrically insulating dielectric layer, when immersed in water, increases in weight by less than 10% (w/w).

21. A process for providing an electrically insulating dielectric layer on a substrate comprising:
    a) printing the ink or coating composition according to claim 1, onto a substrate; and
    b) curing the ink or coating composition.

22. The process according to claim 21, wherein the ink or coating composition is inkjet printed onto the substrate, and/or wherein the ink or coating composition is cured using ultra-violet radiation.

23. A substrate comprising an electrically insulating dielectric layer printed thereon produced by the process according to claim 21.

24. A printed electronic device comprising at least one electrically insulating dielectric layer according to claim 19.

25. A printed electronic device comprising at least one electrically insulating dielectric layer produced by the process of claim 21.

26. The ink or coating composition according to claim 1, wherein the ratio of the at least one multifunctional hybrid monomer to the multifunctional monomer is greater than 2:1.

27. The ink or coating composition according to claim 1, wherein the ratio of the at least one multifunctional hybrid monomer to the multifunctional monomer is greater than 5:1.

28. The ink or coating composition according to claim 1, wherein the ratio of the at least one multifunctional hybrid monomer to the multifunctional monomer is greater than 10:1.

29. The ink or coating composition according to claim 16, wherein the ink or coating composition further comprises an inorganic material selected from alumina, zirconia, titania, ceria, zinc oxide, and iron oxide.

* * * * *